United States Patent [19]

Dunn et al.

[11] 4,450,129

[45] May 22, 1984

[54] METHOD OF MAKING MINIATURE DOLL HEADS

[75] Inventors: Ralph Dunn, Playa Del Rey; Leonard R. Coleman, Long Beach, both of Calif.

[73] Assignee: Mattel, Inc., Hawthorne, Calif.

[21] Appl. No.: 460,347

[22] Filed: Jan. 24, 1983

[51] Int. Cl.³ .......................... B29C 5/12; B29D 9/00
[52] U.S. Cl. .................................. 264/132; 264/232; 264/246; 264/344; 264/DIG. 60; 427/352; 427/393.5
[58] Field of Search ........... 264/132, 129, 230, 342 R, 264/245, 246, 344, DIG. 71, DIG. 60, 305, 309, 131, 134, 232, 234; 427/352, 393.5; 29/433; 46/135 R, 164

[56] References Cited

U.S. PATENT DOCUMENTS

| | | | |
|---|---|---|---|
| 2,793,399 | 5/1957 | Gallay et al. | 264/342 R |
| 4,220,619 | 9/1980 | Kersten | 264/342 R |
| 4,285,746 | 8/1981 | DePuy et al. | 264/342 R |

*Primary Examiner*—Willard E. Hoag
*Attorney, Agent, or Firm*—Reagin & King

[57] ABSTRACT

A process is disclosed for making miniature doll heads. An oversized head is formed of a shrinkable plastisol including a plasticizer, and facial features are applied to the head using a shrinkable paint. Hair is rooted to the scalp of the oversized head. The head is reduced in size by extracting the plasticizer from the plastisol. During the extraction, the head and its facial features shrink simultaneously to form the miniature head.

9 Claims, 7 Drawing Figures

METHOD OF MAKING MINIATURE DOLL HEADS

BACKGROUND OF THE INVENTION

This invention relates to toy dolls and more particularly, to a method of making miniature doll heads.

There have been a myriad of toy dolls developed over the years for use by children. One of the most attractive portions of these toy dolls is the doll's head.

The head of a doll is usually constructed by hollow molding a suitable plastic material into the desired shape of the head. The facial expression of the doll is formed by painting the facial features such as the eyes, the mouth, and the cheeks to produce the desired expression. The doll head is completed by attaching doll hair to the scalp; the hair is then groomed to form the desired hair style.

To be successful in the marketplace, a toy doll must be inexpensive to purchase. One way to reduce the cost of producing a doll is to use rapid mass production techniques in its construction. With regard to the doll head, high speed molding techniques are generally used to form the shape of the head. Painting of the facial features is usually accomplished by placing the doll face behind a mask having openings therein and by spray painting the features through the mask. The mask openings form the desired shape of each painted area and act to properly locate each area with respect to the doll face.

Attachment of the doll hair is usually accomplished by sewing (or rooting) strands of hair to the scalp using a rooting machine. The head is mounted to the rooting machine by inserting a spindle portion of the machine into the hollow interior of the head through a neck opening provided therein. The strands are then looped through the scalp surface using holes formed in rows by the rooting machine. Each strand is then cut to a length calculated to produce hair of the desired length for the completed doll head. The length of the hair is in turn made proportional to the size of the doll head. The spacing between adjacent holes and adjacent rows is also made proportional to the size of the doll head.

In recent years, miniature toy dolls have been produced which have become very popular among young children. Producing such a miniature doll of course requires the production of a miniature doll head. It has been found, however, that prior art methods of mass producing doll heads are not suitable for mass producing miniature doll heads. This is particularly true when the height of the doll head, measured from the bottom of the chin to the crown, is less than about one-half inch.

The unsuitability of prior art methods in the mass production of miniature doll heads is due to several factors. For example, it has been found that the facial features of such doll heads are so small and are so close together that the prior art spray painting techniques are not suitable for forming clearly defined patterns of paint. Therefore, the facial expression of a miniature doll face painted using such prior art methods is often blurred and difficult to distinguish. Accordingly, miniature doll faces are in many instances hand painted using a fine artist brush to produce the desired detail. This method is obviously unsuitable for mass producing doll heads.

It has also been found that the small size of a miniature doll head generally precludes the use of prior art hair rooting methods to attach strands of doll hair to such miniature heads. This is so because the neck opening provided in a miniature head is generally too small to permit the insertion of the rooting spindle. Further, there is insufficient room within the hollow doll head to provide the maneuverability required to root the hair in the desired pattern of closely spaced holes and rows. Accordingly, in many instances hair is attached to a miniature doll head by first attaching the hair to a thin cap. The cap is then adhesively attached to the scalp. This method is time consuming and hence increases the cost of producing miniature doll heads.

Accordingly, it is an object of the present invention to provide a new method of making miniature doll heads.

It is another object of this invention to produce a miniature doll head using mass production techniques to form the facial expression.

It is yet another object of this invention to produce a miniature doll head using mass production techniques to attach the doll hair.

SUMMARY OF THE INVENTION

The foregoing and other ogjects of the invention are accomplished by a process in which an oversized hollow doll head is formed by molding a shrinkable plastisol material including a vinyl resin and an extractable plasticizer into the desired shape. The oversized head is made larger than the desired size of the miniature doll head, and is of sufficient size to enable the use of rapid mass production techniques to form the facial expression of the doll and to attach the doll hair.

A shrinkable paint is provided which is applied to the face of the oversized doll head to form facial features which realistically simulate the features of the oversized doll head. The paint is applied by spraying it through a mask onto the face.

Doll hair in the form of plastic strands is attached to the scalp of the oversized doll head by threading the strands through spaced apart openings. The openings are spaced apart on the scalp a greater distance than the desired spacing on the miniature doll head.

The oversized doll head having painted facial features and hair is immersed in an extraction solvent which extracts the plasticizer from the plastisol forming the head and also causes the paint applied to the face to shrink. The extraction process causes the doll head and the painted features to reduce in size to form the desired miniature doll head having hair and painted facial features.

DESCRIPTION OF THE PREFERRED EMBODIMENT

Figure 1:
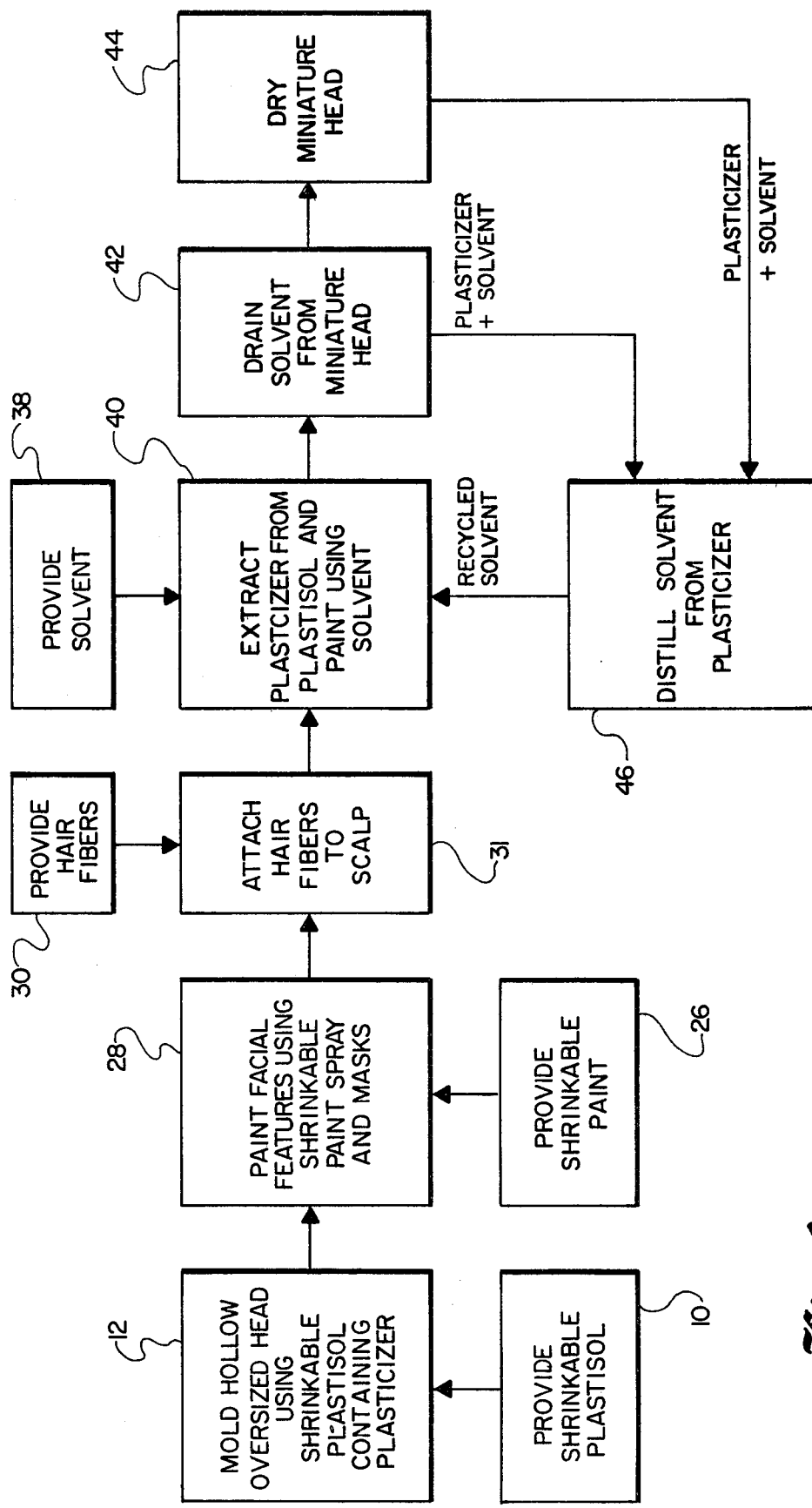
FIG. 1 is a block diagram showing the process steps employed to make a miniature doll head in accordance with this invention.

FIG. 1 shows a block diagram of the steps employed to make a miniature doll head in accordance with the invention. The first step 10 is to provide a shrinkable plastisol material which may be used to mold a doll head. Preferably, the plastisol includes one or more polyvinyl chloride dispersion resins which can range from about 20% to over 75% by weight of the material. One or more plasticizers are used in order to create a liquid mixture and provide a component which is extractable from the cured plastisol.

Heat stabilizers may also be employed in the plastisol formation to prevent degradation during curing. Stabilizers, such as barium, cadmium, zinc or other metal-based stabilizers may be used in amounts ranging from 0.5% to 1.5% by weight, and epoxidized oil based stabilizers may be used in amounts ranging from 1% to 3% by weight to assist in processing. A typical composition for a shrinkable plastisol for use in the present invention is listed in Table 1.

TABLE 1

| Shrinkable Plastisol | |
|---|---|
| Component | % By Weight |
| Di-octyl phthalate type plasticizer (as type No. S-711, supplied by Monsanto Chemical Co.) | 8.6% |
| Isobytyrate type plasticizer (such as type No. TXIB, supplied by Eastman Chemical Co.) | 51.7% |
| Barium, cadmium and zinc based heat stabilizer (such as type No. Mark KCB, supplied by Argus Chemical Co.) | 1.0% |
| Epoxidized oil based heat stabilizer (such as type No. Drapex 4.4, supplied by Argus Chemical Co.) | 1.7% |
| Pigment (such as type No. FC-3816, supplied by Ferro Co.) | 0.5% |
| Thickener (such as type No. Cab-O-Sil, supplied by Cabot Chemical Co.) | 2.0% |
| PVC resin (such as type No. GEON 121, supplied by B.F. Goodrich Co.) | 34.5% |

The plastisol described above is used to form a hollow oversized doll head as shown by step 12 in FIG. 1. Molding techniques such as rotocasting, well known to those skilled in the art, may be used to form the head. The oversized head is made larger in size than the desired miniature doll head. More particularly, the oversized head is made sufficiently large so that existing mass production techniques may be used to apply facial features and hair to the doll head. As described below, after the facial features and hair have been applied to the oversized head, it is reduced in size by shrinking the plastisol to form the desired miniature doll head.

Figure 2:
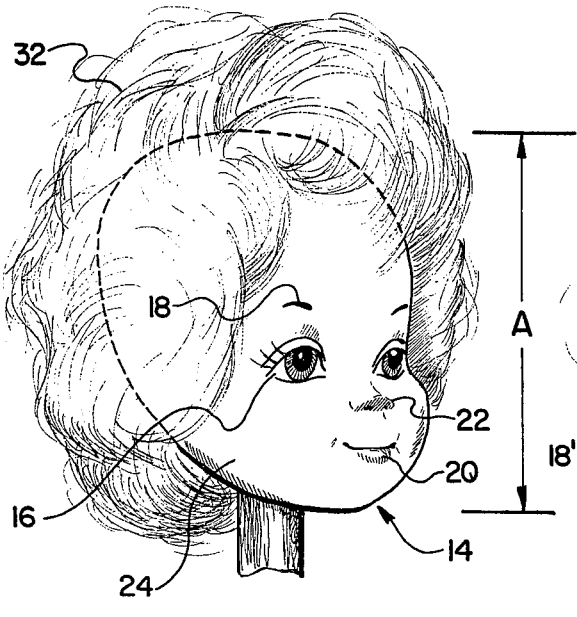
FIG. 2 is a perspective view of the oversized doll head formed as part of the process of FIG. 1, showing the painted facial features and the hair attached.

Referring to FIG. 2, there is shown an oversized doll head 14 where the size of the head as measured from the chin to the crown is represented by the dimension A. It has been found that doll heads in which the dimension A is at least one half inch are sufficiently large to permit the use of high speed spray painting techniques to form the facial features. In addition, such doll heads may be directly mounted on rooting machines which are used to rapidly attach hair to the scalp of the head.

The method of the present invention is directed to making doll heads in which the dimension A is less than approximately one half inch. Such heads are referred to herein as miniature doll heads. In a preferred embodiment of the present method, the oversized head 14 has a dimension A of one half inch or slightly greater.

The facial features of the head 14 are formed by painting designated areas of the face such as the eyes 16, eyebrows 18, mouth 20, nose 22, and cheeks 24 using shrinkable paint. The reason for using shrinkable paint is so that the painted areas of the face of the head 14 will reduce in size without peeling or cracking when the plastisol is shrunk to form the miniature head.

It has been found that vinyl-modified acrylic-type lacquers such as type no. Incoat V-1151, supplied by International Coating Co.; type no. 01-Q82127, supplied by Bee Chemical Co.; or type no. 4212 W-14, supplied by Western Specialty Coating Co. possess the property of shrinking along with the plastisol when the plasticizer is extracted as described below.

The shrinkable paint provided at step 26 of FIG. 1 is applied in various colors to the face of the head 14 by spraying the paint through suitable masks at step 28 of FIG. 1 to form the facial expressions in a manner well known to those skilled in the art.

After the paint has dried, hair is attached to the scalp of the head 14. Hair fibers are provided at step 30 which are formed of synthetic plastic filaments. Materials such as polyvinylidene chloride (Saran), polypropylene, and nylon may be used. The materials are unaffected by the plasticizer extraction step described below and do not shrink. Referring to step 31 of FIG. 1 and FIGS. 2, 3, and 4, hair 32 is attached to scalp 33 of the head 14 using a rooting machine which loops the strands through openings 34 formed in the scalp 33.

In the preferred embodiment, Saran fibers are used for the hair and are precut to the desired length of the hair for the miniature doll head. Further, the spacings between openings 34 in the scalp 33 are made wider than the desired spacings for the miniature doll head to account for the shrinkage of the scalp 33. For example, in the preferred embodiment Saran fibers 36 consisting of ten filaments, sixty denier each filament, are rooted to the scalp 33 with about one-eighth of an inch between rows of openings 34, and with about ten openings per inch in each row, corresponding to the dimension B in FIG. 4.

After the hair 32 has been attached, the head 14 is reduced in size by extracting the plasticizer from the plastisol. An extraction solvent is provided at step 38 of FIG. 1 and in the preferred embodiment is V M & P Naptha or Special Napthalite with up to 20% by volume methylene chloride added. The extraction step 40 includes immersing the painted head 14, with hair attached, into the solvent which is maintained at an elevated temperature, preferably between 60° F. and 100° F.

The head 14 is allowed to soak in the solvent until the desired amount of shrinkage has occurred. Generally, the head 14 remains in the solvent for a period of time lasting from two to twenty-four hours. The solvent may be agitated in order to move the plasticizer-rich solvent away from the head 14 to speed up the extraction.

After the desired shrinkage has taken place, the resultant miniature head is rinsed with fresh solvent and then thoroughly drained at step 42. The head is then allowed to dry at step 44 for a sufficient time to allow excess solvent to migrate out of the vinyl resin. The head may be heated to about 130° F. to accelerate this process.

The plasticizer and solvent solution collected at steps 42 and 44 may be separated and the solvent may be recycled by distilling the solution at step 46 and providing the recycled solvent back to extraction step 40.

It should be noted that the total amount of shrinkage of the plastisol is dependent upon the amount of plasticizer in the plastisol composition. For example, the plastisol composition listed in Table 1 provides about a 30% shrinkage in the size of the head 14.

Figure 5:
FIG. 5 is a perspective view of the miniature doll head formed by the process of FIG. 1.
Figure 3:
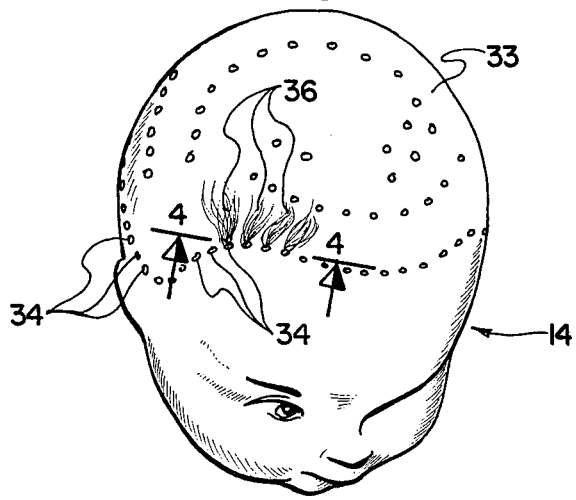
FIG. 3 is another perspective view of the oversized doll head of FIG. 2 with the hair removed to show the pattern of openings in the scalp through which the hair is attached.

As the plasticizer is extracted, the size of the head 14 reduces and at the same time the paint shrinks so that the facial features of the head 14 reduce in proportion to the head size. FIG. 5 shows a perspective view of the miniature doll head 14' which results when the oversized head 14 is processed through the method of the present invention. The dimension A' is approximately 70% of the dimension A or approximately 0.35 inches. Further, all of the painted features 16', 18', 20', 22' and 24' have been reduced proportionally in size from the counterpart features shown in FIG. 2.

Figure 6:
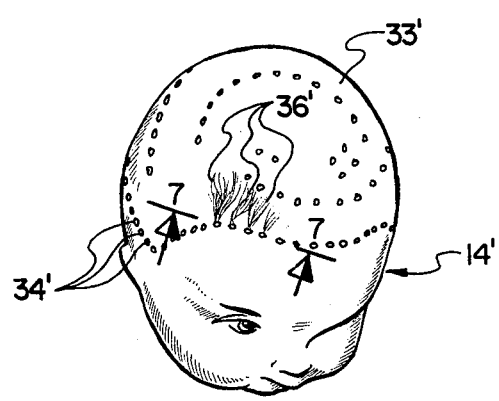
FIG. 6 is another perspective view of the miniature doll head of FIG. 5 with the hair removed to show the reduced pattern of openings in the scalp through which the hair is attached.
Figure 4:
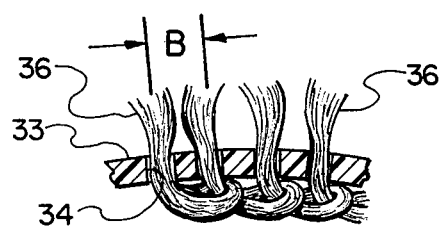
FIG. 4 is a cross-sectional view of the scalp of the doll head of FIG. 3, taken along the line 4—4.
Figure 7:
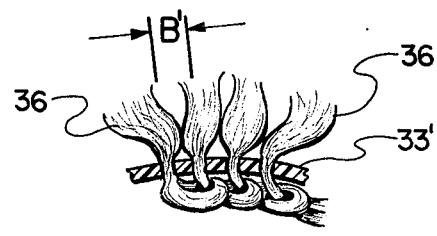
FIG. 7 is a cross-sectional view of the scalp of the doll head of FIG. 6 taken along the line 7—7.

The Saran fibers 36 are unaffected by the solvent and maintain their shape and length. Thus, if the fibers are pre-curled, they will maintain their appearance. The effect of the miniaturizing process on the spacing between hair fibers is shown in FIGS. 6 and 7. The openings 34' in the miniature scalp 33' are closer together than the openings 34 in the scalp 33, with the result that the fibers 36' are closer together than the fibers 36. Hence the dimension B' of FIG. 7 is smaller than the dimension B of FIG. 4. As stated above, the dimension B is chosen to account for the reduction in size so that the hair 32 on the miniature head 14' will be properly spaced.

While the invention is thus disclosed and a particular embodiment thereof is described in detail, it is not intended that the invention be limited solely to this disclosed embodiment. Instead, many modifications will occur to those skilled in the art which lie within the spirit and scope of the invention. It is thus intended that the invention be limited in scope only by the appended claims.

What is claimed is:

1. A method of making a miniature doll head comprising the steps of:
   providing a plastisol material including a plastic resin and an extractable plasticizer;
   forming an oversized hollow doll head from the plastisol where the oversized doll head is larger than the desired size of the miniature doll head;
   providing a solvent shrinkable paint capable of decreasing in size as the substrate to which it is applied decreases in size;
   applying the paint to the face of the oversized doll head to form facial features which realistically simulate the facial features of the oversized doll head;
   providing doll hair formed of plastic strands; and
   attaching the doll hair to the scalp of the oversized doll head, where the hair is spaced apart on the scalp a greater distance than the desired spacing on the miniature doll head so that when the oversized doll head is reduced in size the spacing of the doll hair will be reduced to the desired spacing on the miniature doll head;
   providing an extraction solvent capable of extracting the plasticizer from the plastisol and said paint;
   immersing the oversized doll head in the solvent until sufficient plasticizer is extracted to achieve the desired size reduction;
   draining excess solvent from the part; and
   heating the part to accelerate drying and to cause excess solvent to migrate out of the doll head.

2. A method of making a miniature doll head comprising the steps of:
   providing a shrinkable material;
   forming an oversized doll head from the shrinkable material;
   providing a shrinkable paint;
   applying the paint to the face of the oversized doll head to form facial features;
   providing doll hair formed of plastic strands;
   attaching the doll hair to the scalp of the oversized doll head, where the hair is spaced apart on the scalp a greater distance than the desired spacing on the miniature doll head so that when the oversized doll head is reduced in size the spacing of the doll hair will be reduced to the desired spacing on the miniature doll head; and
   shrinking, simultaneously, the shrinkable material forming the oversized head and the shrinkable paint applied to the face to cause both the oversized head and the painted features to reduce in size to form the desired miniature doll head having painted facial features.

3. A method of making a miniature doll head comprising the steps of:
   providing a plastisol material including a plastic resin and an extractable plasticizer, where the plastic resin includes vinyl resin and the plasticizer includes one or more esters of phthalic acid;
   forming an oversized hollow doll head from the plastisol where the oversized doll head is larger than the desired size of the miniature doll head;
   providing a solvent shrinkable paint capable of decreasing in size as the substrate to which it is applied decreases in size;
   applying the paint to the face of the oversized doll head to form facial features which realistically simulate the facial features of the oversized doll head; and
   extracting the plasticizer from the plastisol forming the oversized doll head to cause both the doll head and the paint features to reduce in size to form the desired miniature doll head having painted facial features.

4. A method of making a miniature doll head comprising the steps of:
   providing a plastisol material including a plastic resin and an extractable plasticizer, where the plastic resin includes vinyl resin and the plasticizer includes an ester of isobutyric acid;
   forming an oversized hollow doll head from the plastisol where the oversized doll head is larger than the desired size of the miniature doll head;
   providing a solvent shrinkable paint capable of decreasing in size as the substrate to which it is applied decreases is size;
   applying the paint to the face of the oversized doll head to form facial features which realistically simulate the facial features of the oversized doll head; and
   extracting the plasticizer from the plastisol forming the oversized doll head to cause both the doll head and the painted features to reduce in size to form the desired miniature doll head having painted facial features.

5. A method of making a miniature doll head comprising the steps of:
   providing a plastisol material including a plastic resin and an extractable plasticizer;
   forming an oversized hollow doll head from the plastisol where the oversized doll head is larger than the desired size of the miniature doll head;
   providing a solvent shrinkable paint capable of decreasing in size as the substrate to which it is applied decreases in size and including a vinyl-modified acrylic lacquer;
   applying the paint to the face of the oversized doll head to form facial features which realistically simulate the facial features of the oversized doll head; and
   extracting the plasticizer from the plastisol forming the oversized doll head to cause both the doll head and the paint features to reduce in size to form the desired miniature doll head having painted facial features.

6. A method of making a miniature doll head comprising the steps of:
   providing a plastisol material including a plastic resin and an extractable plasticizer;
   forming an oversized hollow doll head from the plastisol where the oversized doll head is larger than the desired size of the miniature doll head;
   providing a solvent shrinkable paint capable of decreasing in size as the substrate to which it is applied decreases in size;
   applying the paint to the face of the oversized doll head by spraying the paint through a mask onto the face of the oversized doll head to form facial features which realistically simulate the facial features of the oversized doll head; and
   extracting the plasticizer from the plastisol forming the oversized doll head to cause both the doll head and the painted features to reduce in size to form the desired miniature doll head having painted facial features.

7. A method of making a miniature doll head comprising the steps of:
   providing a plastisol material including a plastic resin and an extractable plasticizer;
   forming an oversized hollow doll head from the plastisol where the oversized doll head is larger than the desired size of the miniature doll head;
   providing a solvent shrinkable paint capable of decreasing in size as the substrate to which it is applied decreases in size;
   applying the paint to the face of the oversized doll head to form facial features which realistically simulate the facial features of the oversized doll head; and
   extracting the plasticizer from the plastisol forming the oversized doll head to cause both the doll head and the painted features to reduce in size to form the desired miniature doll head having painted facial features, where said extraction includes
   providing an extraction solvent capable of extracting the plasticizer from the plastisol; and
   immersing the oversized doll head in the solvent until sufficient plasticizer is extracted to achieve the desired size reduction.

8. The method of claim 7 further including:
   heating the solvent;
   agitating the solvent so that the plasticizer-rich solvent is moved away from the doll head as the extraction progresses;
   draining excess solvent from the part; and
   heating the part to accelerate drying and to cause excess solvent to migrate out of the doll head.

9. The method of claim 7 in which the solvent includes naptha.

* * * * *